United States Patent
Solanki et al.

(10) Patent No.: US 11,407,544 B2
(45) Date of Patent: Aug. 9, 2022

(54) PART PACKING SYSTEM AND METHOD

(71) Applicants: TE Connectivity Services GmbH, Schaffhausen (CH); Tyco Electronics (Shanghai) Co., Ltd., Shanghai (CN)

(72) Inventors: Swapnilsinh Solanki, Harrisburg, PA (US); Edward T. Price, III, Mechanicsburg, PA (US); Sonny O. Osunkwo, Harrisburg, PA (US); Jiankun Zhou, Middletown, PA (US); An Yang, Shanghai (CN)

(73) Assignees: Tyco Electronics (Shanghai) Co., Ltd.; TE Connectivity Solutions GmbH

( * ) Notice: Subject to any disclaimer, the term of this patent is extended or adjusted under 35 U.S.C. 154(b) by 100 days.

(21) Appl. No.: 17/081,072

(22) Filed: Oct. 27, 2020

(65) Prior Publication Data

US 2022/0111987 A1    Apr. 14, 2022

(51) Int. Cl.
| | |
|---|---|
| *B65B 43/30* | (2006.01) |
| *B25J 9/16* | (2006.01) |
| *B65H 35/00* | (2006.01) |
| *B65B 43/36* | (2006.01) |
| *B65B 43/12* | (2006.01) |

(Continued)

(52) U.S. Cl.
CPC ............ *B65B 43/30* (2013.01); *B25J 9/1687* (2013.01); *B25J 15/0028* (2013.01); *B25J 15/0616* (2013.01); *B65B 5/045* (2013.01); *B65B 43/123* (2013.01); *B65B 43/36* (2013.01); *B65H 35/008* (2013.01); *B65H 2701/191* (2013.01)

(58) Field of Classification Search
CPC ....... B65B 43/30; B65B 43/123; B65B 43/36; B65B 43/28; B65B 5/045; B65B 5/08; B65B 5/105; B25J 9/1687; B25J 15/0028; B25J 15/0616; B65H 35/008; B65H 2701/191

See application file for complete search history.

(56) References Cited

U.S. PATENT DOCUMENTS

| | | | | |
|---|---|---|---|---|
| 4,345,629 | A | * | 8/1982 | Inglett, Jr. ............... B65B 43/18 53/586 |
| 5,442,898 | A | * | 8/1995 | Gabree ................... B65B 43/36 53/385.1 |

(Continued)

FOREIGN PATENT DOCUMENTS

| | | | | |
|---|---|---|---|---|
| CA | 1092565 A | * | 12/1980 | ............. B65B 43/30 |

*Primary Examiner* — Thomas M Wittenschlaeger

(57) ABSTRACT

A part packing system for packing a part in an elongated bag includes a bag holding machine including a first bag gripper mechanism, a second bag gripper mechanism, and an air nozzle. The first bag gripper mechanism is configured to hold a first end of the elongated bag. The first bag gripper mechanism opens the first end of the elongated bag. The second bag gripper mechanism is configured to hold a second end of the elongated bag. The second bag gripper mechanism closes the second end of the elongated bag. The air nozzle is located proximate to the first bag gripper mechanism. The air nozzle is configured to inflate the elongated bag with an airflow directed into the first end of the elongated bag. The first bag gripper mechanism holds the inflated elongated bag with the first end open to receive the part in the open first end while the air nozzle directs the airflow into the elongated bag.

20 Claims, 4 Drawing Sheets

(51) Int. Cl.
*B25J 15/06* (2006.01)
*B25J 15/00* (2006.01)
*B65B 5/04* (2006.01)

(56) References Cited

U.S. PATENT DOCUMENTS

| | | | | |
|---|---|---|---|---|
| 5,485,714 | A * | 1/1996 | Montalvo | B65B 43/36 |
| | | | | 53/385.1 |
| 2014/0180479 | A1* | 6/2014 | Argue | B65B 5/105 |
| | | | | 901/47 |
| 2020/0130952 | A1* | 4/2020 | Eisenberg | B65B 43/465 |
| 2021/0053219 | A1* | 2/2021 | Nishimura | B25J 9/1682 |

\* cited by examiner

PART PACKING SYSTEM AND METHOD

CROSS REFERENCE TO RELATED APPLICATIONS

This application claims benefit to Chinese Application No. 202011073680.1, filed 9 Oct. 2020, the subject matter of which is herein incorporated by reference in its entirety.

BACKGROUND OF THE INVENTION

The subject matter herein relates generally to part packing systems and methods.

Bagging and packaging of irregular shaped parts is difficult. For example, elongated parts, such as those having length to width or diameter ratios of greater than 20:1, are difficult to put into bags for packaging. Typically, bagging and packaging of such irregular shaped parts is a manual process due to complexity of automated processes.

A need remains for an automated part packing system and method for irregular shaped parts.

BRIEF DESCRIPTION OF THE INVENTION

In an embodiment, a part packing system for packing a part elongated along a longitudinal axis in an elongated bag is provided. The part packing system includes a bag holding machine including a first bag gripper mechanism, a second bag gripper mechanism, and an air nozzle. The first bag gripper mechanism is configured to hold a first end of the elongated bag. The first bag gripper mechanism opens the first end of the elongated bag. The second bag gripper mechanism is configured to hold a second end of the elongated bag. The second bag gripper mechanism closes the second end of the elongated bag. The air nozzle is located proximate to the first bag gripper mechanism. The air nozzle is configured to inflate the elongated bag with an airflow directed into the first end of the elongated bag. The first bag gripper mechanism holds the inflated elongated bag with the first end open to receive the part in the open first end while the air nozzle directs the airflow into the elongated bag.

In another embodiment, a part packing system for packing a part elongated along a longitudinal axis in an elongated bag is provided. The part packing system includes a bag holding machine including a first bag gripper mechanism configured to hold a first end of the elongated bag, a second bag gripper mechanism configured to hold a second end of the elongated bag, and an air nozzle located proximate to the first bag gripper mechanism. The first bag gripper mechanism is configured to open the first end of the elongated bag. The air nozzle is configured to inflate the elongated bag with an airflow directed into the first end of the elongated bag when the first bag gripper mechanism opens the first end of the elongated bag. The part packing system includes a part loading machine having a part gripper mechanism configured to hold the part and move the part into the inflated elongated bag through the open first end.

In another embodiment, a method of packing a part in an elongated bag elongated along a longitudinal axis is provided. The method grabs a first end of the elongated bag using a first bag gripper mechanism and grabs a second end of the elongated bag using a second bag gripper mechanism. The method opens the first end of the elongated bag, inflates the elongated bag by blowing air in the first end of the elongated bag using an air nozzle and grabs the part using a part gripper mechanism. The method loads the part into the first end of the elongated bag, and releases the part from the part gripper mechanism to drop the part into the elongated bag. The method grabs the elongated bag with the part therein using the part gripper mechanism and moves the elongated bag with the part therein to a packaging station using the part gripper mechanism.

DETAILED DESCRIPTION OF THE INVENTION

Figure 1:
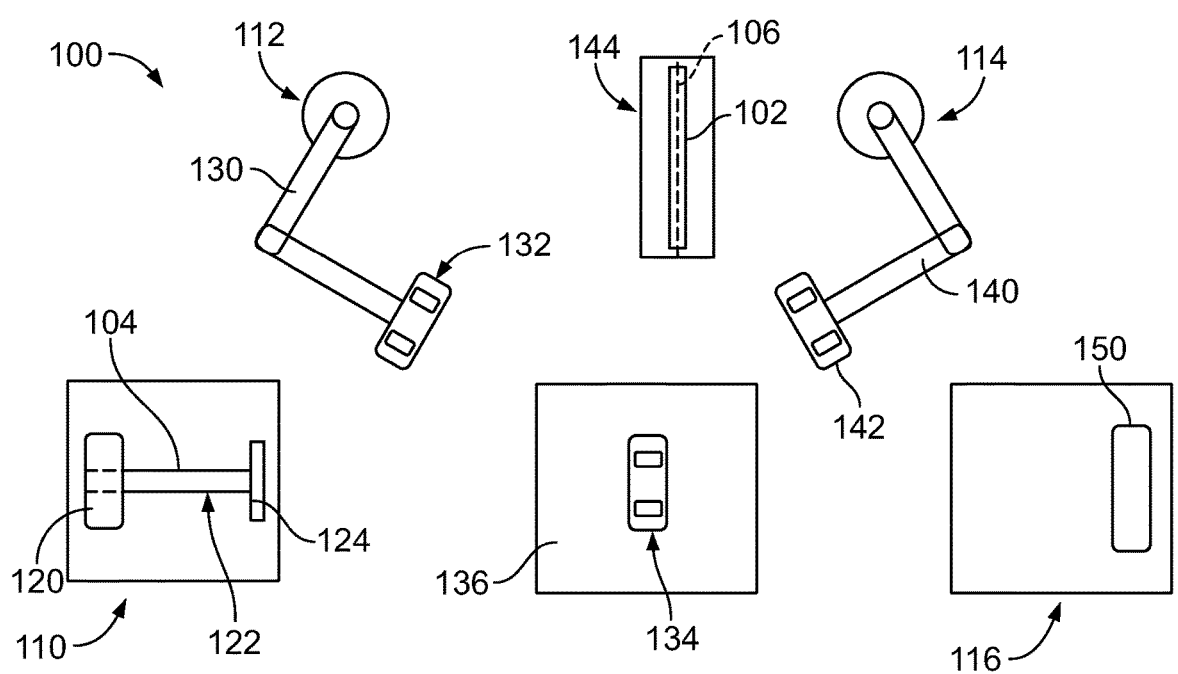
FIG. 1 is a schematic view of a part packing system in accordance with an exemplary embodiment.

FIG. 1 is a schematic view of a part packing system 100 in accordance with an exemplary embodiment. In an exemplary embodiment, the part packing system 100 is used for packing peculiar shaped parts 102, such as oblong or elongated parts, into an appropriately sized and shaped elongated bag 104. The part 102 is elongated along a longitudinal axis 106. In various embodiments, the part 102 may be generally cylindrical shaped or tubular shape. The elongated bag 104 is similarly tubular shaped to receive the elongated part 102. In various embodiments, the part 102 may have a length to diameter ratio greater than 10:1. The part may have a length to diameter ratio greater than 20:1 in various embodiments or 30:1 in other various embodiments. In an exemplary embodiment, the part packing system 100 is an automated system using machines to pack the part 102 into the elongated bag 104. For example, the part packing system 100 may load the part 102 into the elongated bag 104 without human intervention.

In an exemplary embodiment, the part packing system 100 includes a bag dispensing machine 110, a bag holding machine 112, a part loading machine 114, and a product packing machine 116. The part packing system 100 may include other machines for performing other processes in alternative embodiments. The bag dispensing machine 110 is used to dispense the elongated bags 104. The bag holding machine 112 is used to hold the elongated bag 104 during the packing process. The part loading machine 114 is used for packing the part 102 and the elongated bag 104 held by the bag holding machine 112. When the part is packaged in the elongated bag, the combined part\bag product may be further processed at the product packing machine 116. For example, the products may be loaded into a box or been at the product packing machine 116. The products may be labeled at the product packing machine 116.

The bag dispensing machine 110 holds a supply 120 of the elongated bags 104. In various embodiments, the supply of elongated bags 104 may be arranged as a roll, such as on a spool or reel. The elongated bags 104 are delivered to a bag dispensing location 122, such as a long a top or a side of a housing or holder for the supply 120 of elongated bags 104.

In an exemplary embodiment, the elongated bags 104 may be a continuous from the elongated bags 104. For example, the elongated bags 104 may be formed from a continuous plastic tube. In an exemplary embodiment, the bag dispensing machine 110 includes a cutter 124 used to separate the elongated bags 104 from the continuous supply 120. The cutter 124 cuts the elongated bags 104 to length. Optionally, the bag dispensing machine 110 may be configured to dispense different lengths of elongated bags 104 for receiving different length parts 102.

The bag holding machine 112 retrieves the elongated bags 104 from the bag dispensing machine 110 and moves the elongated bags 104 to a part loading station. In an exemplary embodiment, the bag holding machine 112 includes a bag manipulator 130 and a bag gripper mechanism 132 mounted to the bag manipulator 130. The bag gripper mechanism 132 is configured to hold an end of the elongated bag 104. The bag manipulator 130 is movable in three-dimensional space to move the bag gripper mechanism 132. For example, the bag manipulator 130 moves the bag gripper mechanism 132 to pick up the elongated bag 104 and to position the elongated bag 104 (for example, relative to the part loading machine 114) during loading of the part 102 into the elongated bag 104. In an exemplary embodiment, the bag manipulator 130 is a multiaxis robot configured to move in three-dimensional space. In an exemplary embodiment, the bag gripper mechanism 132 include one or more suction cups used to hold the elongated bag 104. The bag gripper mechanism 132 may hold the elongated bag 104 by vacuum pressure. In other various embodiments, the bag gripper mechanism 132 may include gripping fingers configured to pinch the elongated bag 104 to hold the elongated bag 104. Other types of gripper mechanisms may be used in alternative embodiments.

In an exemplary embodiment, the bag holding machine 112 includes a second bag gripper mechanism 134 configured to hold a second end of the elongated bag 104. The second bag gripper mechanism 134 is provided at the part loading station. In various embodiments, the second bag gripper mechanism 134 is mounted to a fixture 136 which holds the second bag gripper mechanism 134 in a fixed location. In alternative embodiments, the second bag gripper mechanism 134 may be mounted to a second bag manipulator (not shown) used to move the second bag gripper mechanism 134 and three-dimensional space, such as to retrieve the second end of the elongated bag 104 and to position the elongated bag 104 relative to the part loading machine 114. The second bag gripper mechanism 134 may include suction cups for holding the second end of the elongated bag 104. The second bag gripper mechanism 134 may hold the elongated bag 104 by vacuum pressure. In other various embodiments, the second bag gripper mechanism 134 may include gripping fingers configured to pinch the elongated bag 104. Other types of gripper mechanisms may be used in alternative embodiments.

The part loading machine 114 retrieves the parts 102 and loads the part 102 into the elongated bag 104 at the part loading station. In an exemplary embodiment, the part loading machine 114 includes a part manipulator 140 and a part gripper mechanism 142 mounted to the part manipulator 140. The part gripper mechanism 142 may pick up the part 102 from an end of the part 102 or from the middle of the part 102. The part manipulator 140 is movable in three-dimensional space to move the part gripper mechanism 142. For example, the part manipulator 140 moves the part gripper mechanism 142 to pick up the part 102 at a part retrieval location 144, move the part 102 to a loading position relative to the elongated bag 104, and loads the part 102 into the elongated bag 104. Optionally, multiple parts 102 may be stored at the part retrieval location 144 or transported to the part retrieval location 144, such as by a conveyor. In an exemplary embodiment, the part manipulator 140 is a multi-axis robot configured to move in three-dimensional space. In an exemplary embodiment, the part gripper mechanism 142 may include gripping fingers or jaws configured to pinch the part 102 to hold the elongated part 102. In other various embodiments, the part gripper mechanism 142 include one or more suction cups used to hold the part 102. The part gripper mechanism 142 may hold the part 102 by vacuum pressure. Other types of gripper mechanisms may be used in alternative embodiments.

The product packing machine 116 includes a bin, box, or other container 150 that receives the products (for example, the elongated bag 104 with the part 102 loaded inside the elongated bag 104). The part loading machine 114 transports the product to the container 150. In alternative embodiments, a separate product manipulator may be provided to retrieve and move the product to the product packing machine 116. For example, a separate product manipulator having a product gripper mechanism may retrieve the product after the part 102 is loaded in the elongated bag 104. In various embodiments, the product packing machine 116 may include a sealing device for sealing the first end and/or the second end of the elongated bag 104 to close the part 102 in the elongated bag 104. In various embodiments, the product packing machine 116 may include a labeling device, such as for applying a shipping label or other appropriate labels to the product or the container 150.

In an exemplary embodiment, the elongated parts 102 are loaded into the elongated bags 104 by an automated process using the part packing system 100. The various machines retrieve them position the elongated bag 104 for loading the elongated part 102 into the elongated bag 104 and package the product for further processing or shipping. The loading and moving of the part 102, the elongated bag 104 and the finished product is performed automatically by the machines without human intervention.

Figure 2:
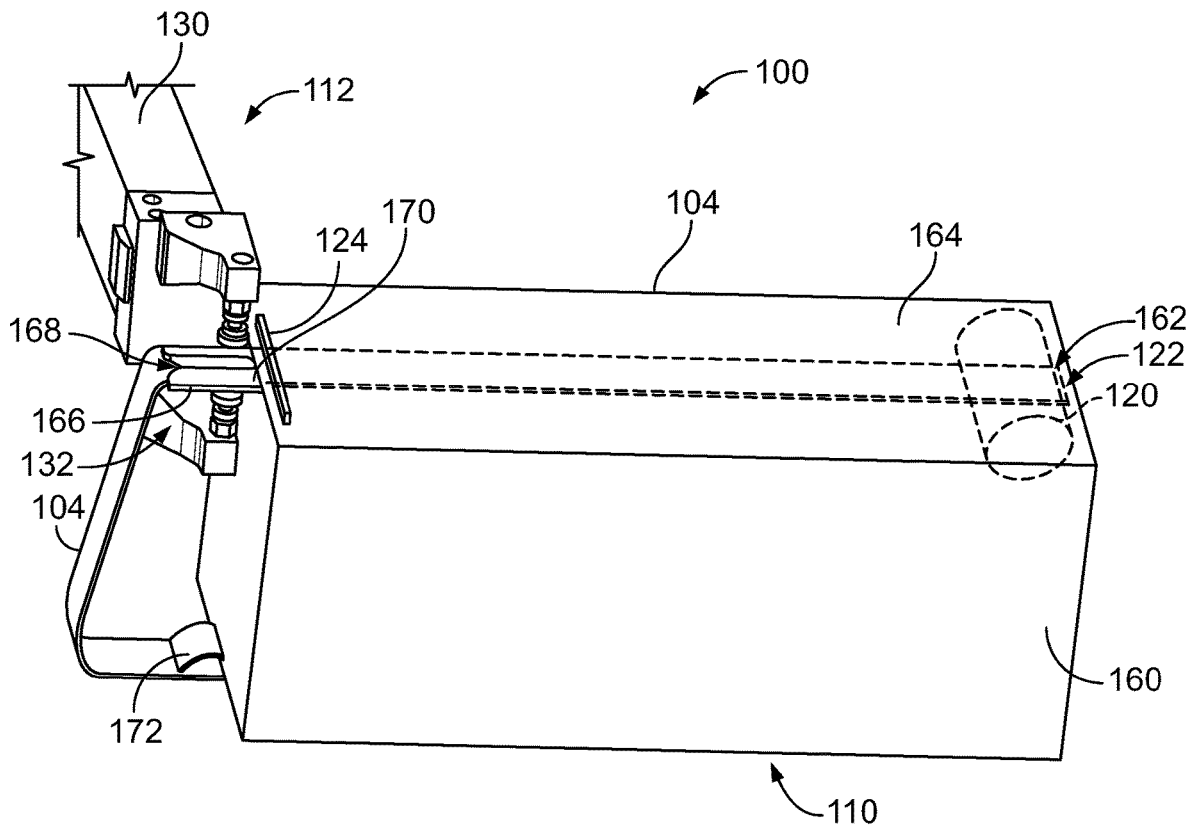
FIG. 2 is a front perspective view of a portion of the part packing system in accordance with an exemplary embodiment.

FIG. 2 is a front perspective view of a portion of the part packing system 100 in accordance with an exemplary embodiment. FIG. 2 illustrates the bag dispensing machine 110 and a portion of the bag holding machine 112. The bag gripper mechanism 132 is maneuvered by the bag manipulator 130 to the bag dispensing location 122 to pick up the elongated bag 104. The bag manipulator 130 is configured to move the bag gripper mechanism 132 away from the bag dispensing machine 110, such as for loading the part 102 into the elongated bag 104.

The bag dispensing machine 110 includes a housing 160 holding the supply 120 of elongated bags 104. In the illustrated embodiment, the supply 120 is held inside the housing 160. The elongated bags 104 are dispatched through an opening 162 in a top 164 of the housing 160. The elongated bags 104 extend across the top 164 to the bag dispensing location 122.

In an exemplary embodiment, the bag dispensing machine 110 includes a platform at the bag dispensing location 122. The platform 166 includes a slot 168 that allows the bag holding machine 112 to access the elongated bag 104 from above and below. For example, the bag gripper mechanism 132 may extend into the slot 168 to interface with the elongated bag 104. The bag gripper mechanism 132 may pinch a first end 170 of the elongated bag 104. A second end 172 of the elongated bag 104 may be free of the bag dispensing machine 110 to allow the elongated bag 104 to be moved away from the bag dispensing machine 110, such as to the part loading station. The cutter 124 is provided proximate to the bag dispensing location 122 two separate the individual elongated bags 104 from the supply 120.

Figure 3:
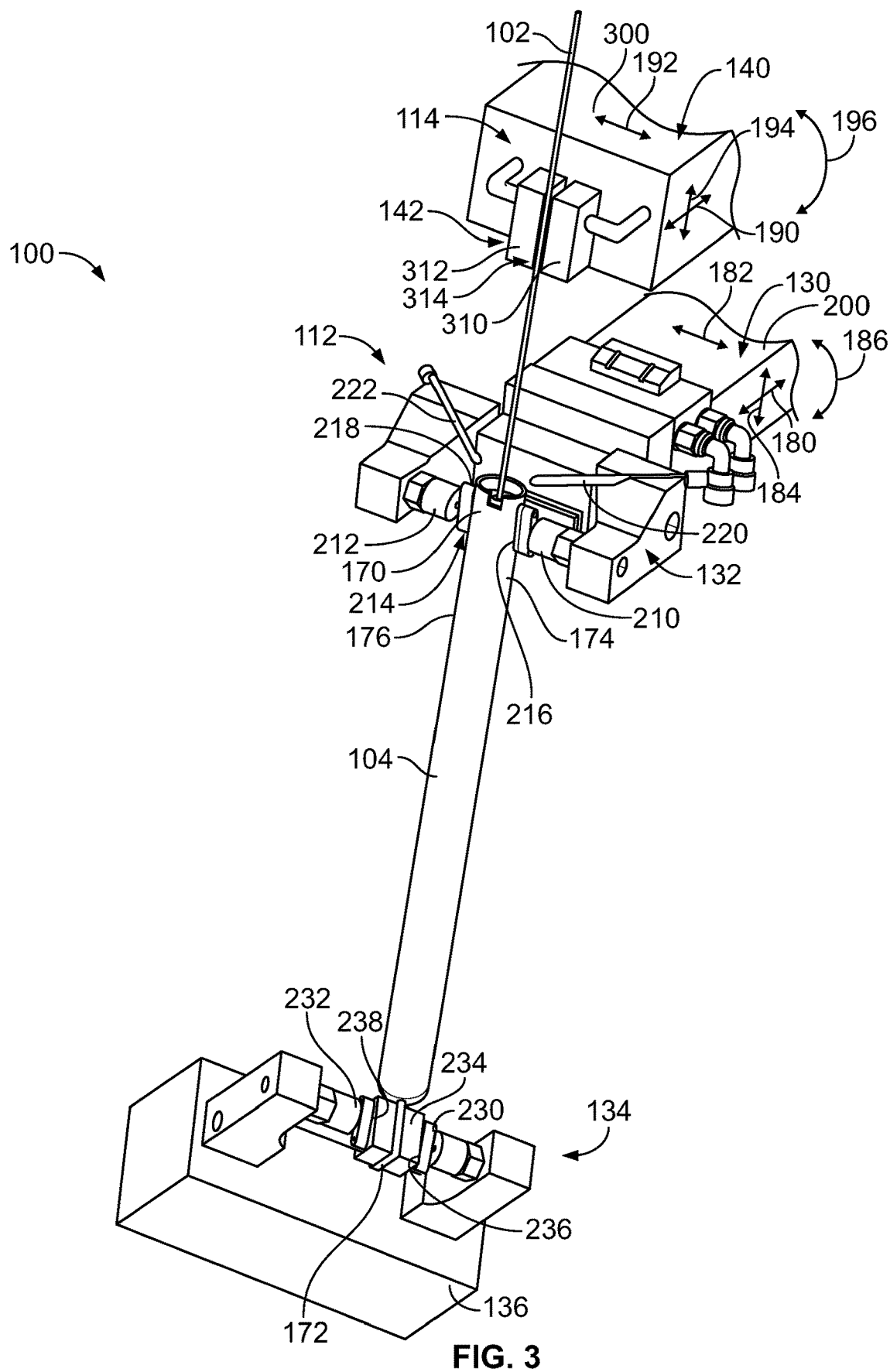
FIG. 3 is a perspective view of a portion of the part packing system in accordance with an exemplary embodiment.

FIG. 3 is a perspective view of a portion of the part packing system 100 in accordance with an exemplary embodiment. FIG. 3 illustrates a portion of the bag holding machine 112 holding the elongated bag 104 and a portion of the part loading machine 114 holding in the part 102. The part 102 is shown partially loaded into the elongated bag 104.

The bag manipulator 130 includes an arm 200, such as a robot arm movable in three-dimensional space. For example, the arm 200 may be movable front-to-rear (for example, in direction 180), side-to-side (for example, in direction 182), up-down (for example, in direction 184) or may be rotated (for example, in direction 186). The bag gripper mechanism 132 is mounted to an end of the arm 200. The arm 200 moves the bag gripper mechanism 132 from the bag pickup station to the part loading station. In an exemplary embodiment, the bag manipulator 130 positions the bag gripper mechanism 132 directly in line with (for example, vertically above) the second bag gripper mechanism 134 held by the fixture 136. The second end 172 of the elongated bag 104 is positioned at the second bag gripper mechanism 134.

The bag gripper mechanism 132 holds the first end 170 of the elongated bag 104. In an exemplary embodiment, the bag gripper mechanism 132 includes a first end effector 210 and a second end effector 212. The first and second end effectors 210, 212 oppose each other across a bag holding space 214. The first end effector 210 and the second end effector 212 hold opposite sides 174, 176 of the first end 170 of the elongated bag 104. In an exemplary embodiment, the first and second end effectors 210, 212 hold the elongated bag 104 using vacuum pressure. For example, the first end effector 210 includes a first suction cup 216 and the second end effector 212 includes a second suction cup 218. The suction cups 216, 218 engage the sides 174, 176 of the elongated bag 104. In an exemplary embodiment, the first end effector 210 and the second end effector 212 are movable relative to each other. For example, the end effectors 210, 212 may be movable toward each other to a closed position and away from each other to an open position. In an exemplary embodiment, the end effectors 210, 212 may be movable to a partially open position (shown in FIG. 3) to open the first end 170 of the elongated bag 104 to receive the part 102. In the closed position, the end effectors 210, 212 may pinch the elongated bag 104 therebetween holding the first end 170 in a closed position. The end effectors 210, 212 are moved to the partially open position to open the first end 170 of the elongated bag 104 a sufficient amount to receive the part 102. In an exemplary embodiment, when the end effectors 210, 212 are moved to the fully open position, the end effectors 210, 212 are released from the elongated bag 104. In various embodiments, the vacuum pressure may be released to release the end effectors 210, 212 from the elongated bag 104.

In alternative embodiments, other types of gripping mechanisms may be used. For example, the first and second end effectors 210, 212 may include pinching fingers or clamps. The pinching fingers may be closed to pinch the sides 174, 176 of the elongated bag 104 to hold the first end 170 of the elongated bag 104. The pinching fingers may be opened to release the elongated bag 104 from the end effectors 210, 212. Other types of gripping mechanisms may be used in alternative embodiments.

In an exemplary embodiment, the bag holding machine 112 includes air nozzles 220 located proximate to the bag gripper mechanism 132. The air nozzles 220 are configured to inflate the elongated bag with an airflow directed into the first end 170 of the elongated bag 104. In the illustrated embodiment, a pair of the air nozzles 220 are provided and positioned adjacent the first and second end effectors 210, 212, respectively. Greater or fewer air nozzles 220 may be provided in alternative embodiments. The air nozzles 220 are positioned adjacent (for example, immediately above) the first end 170 of the elongated bag 104. The air nozzles 220 are angled to direct or below the airflow directly into the open first end 170. The air nozzles 220 inflate the elongated bag 104 to allow the part 102 to be quickly and easily loaded into the elongated bag 104. The air nozzles 220 inflate the elongated bag 104 to oversized the interior space of the elongated bag 104 relative to the part 102 to prevent damage to the elongated bag 104 and allow the part 102 to be loaded into the elongated bag 104 without obstruction.

The second bag gripper mechanism 134 holds the second end 172 of the elongated bag 104. For example, the bag manipulator 130 positions the bag gripper mechanism 132 in line with (for example, above) the second bag gripper mechanism 134 at a predetermined distance to position the second end 172 of the elongated bag 104 at the second bag gripper mechanism 134. In an exemplary embodiment, the second bag gripper mechanism 134 includes a first end effector 230 and a second end effector 232. The first and second end effectors 230, 232 oppose each other across a bag holding space 234. The first end effector 230 and the second end effector 232 hold the opposite sides 174, 176 of the second end 172 of the elongated bag 104. In an exemplary embodiment, the first and second end effectors 230, 232 hold the elongated bag 104 using vacuum pressure. For example, the first end effector 230 includes a first suction cup 236 and the second end effector 232 includes a second suction cup 238. The suction cups 236, 238 engage the sides 174, 176 of the elongated bag 104. In an exemplary embodiment, the first end effector 230 and the second end effector 232 are movable relative to each other. For example, the end effectors 230, 232 may be movable toward each other to a closed position (shown in FIG. 3) and away from each other to an open position. In the closed position, the end effectors 230, 232 may pinch the elongated bag 104 therebetween holding the second end 172 in a closed position. The end effectors 230, 232 172 hold the second end 172 in the closed position to allow the air nozzles 222 inflate the elongated bag 104. The end effectors 230, 232 hold the second end 172 in the closed position to prevent the part 102 from falling out of the elongated bag 104 when the part 102 is loaded into the elongated bag 104. In an exemplary embodiment, when the end effectors 230, 232 are moved to the open position, the end effectors 230, 232 are released from the elongated bag 104. In various embodiments, the vacuum pressure may be released to release the end effectors 230, 232 from the elongated bag 104.

In alternative embodiments, other types of gripping mechanisms may be used. For example, the first and second end effectors 230, 232 may include pinching fingers or clamps. The pinching fingers may be closed to pinch the sides 174, 176 of the elongated bag 104 to hold the second end 172 of the elongated bag 104. The pinching fingers may be opened to release the elongated bag 104 from the end effectors 230, 232. Other types of gripping mechanisms may be used in alternative embodiments.

The part manipulator 140 includes an arm 300, such as a robot arm movable in three-dimensional space. For example, the arm 300 may be movable front-to-rear (for example, in direction 190), side-to-side (for example, in direction 192), up-down (for example, in direction 194) or may be rotated (for example, in direction 196). The part gripper mechanism 142 is mounted to an end of the arm 300. The arm 300 moves the part gripper mechanism 142 from the part pickup station to the part loading station. In an exemplary embodiment, the part manipulator 140 positions the part gripper mechanism 142 directly in line with (for example, vertically above) the bag gripper mechanism 132 to position the part 102 directly in line with (for example, vertically above) the open first end 170 of the elongated bag 104.

The part gripper mechanism 142 holds the part 102, such as at a middle of the part 102. In an exemplary embodiment, the part gripper mechanism 142 includes a first end effector 310 and a second end effector 312. The first and second end effectors 310, 312 oppose each other across a part holding space 314. In an exemplary embodiment, the first and second end effectors 310, 312 hold the part 102 using a compressive force. For example, part 102 may be pinched between the first and second end effectors 310, 312. Alternatively, the first and second end effectors 310, 312 may hold the part 102 by vacuum pressure, such as using suction cups. In an exemplary embodiment, the first end effector 310 and the second end effector 312 are movable relative to each other. For example, the end effectors 310, 312 may be movable toward each other to a closed position and away from each other to an open position. In the closed position (FIG. 3), the end effectors 310, 312 may pinch the part 102 therebetween to move and manipulate the position of the part 102. The end effectors 310, 312 are moved to the open position to release the part 102 into the elongated bag 104.

In an exemplary embodiment, during packing, the part gripper mechanism 142 moves the part 102 toward the elongated bag 104 to at least partially load the part 102 into the elongated bag 104. For example, the part gripper mechanism 142 may load approximately 30%-50% of the part 102 into the elongated bag 104 before releasing the part 102. When the part gripper mechanism 142 releases the part 102, the part 102 drops into the elongated bag 104, such as to the closed second end 172. Optionally, the first end 170 may be closed after the part is fully loaded into the elongated bag 104, such as by closing the end effectors 210, 212 of the bag gripper mechanism 132.

Figure 4:
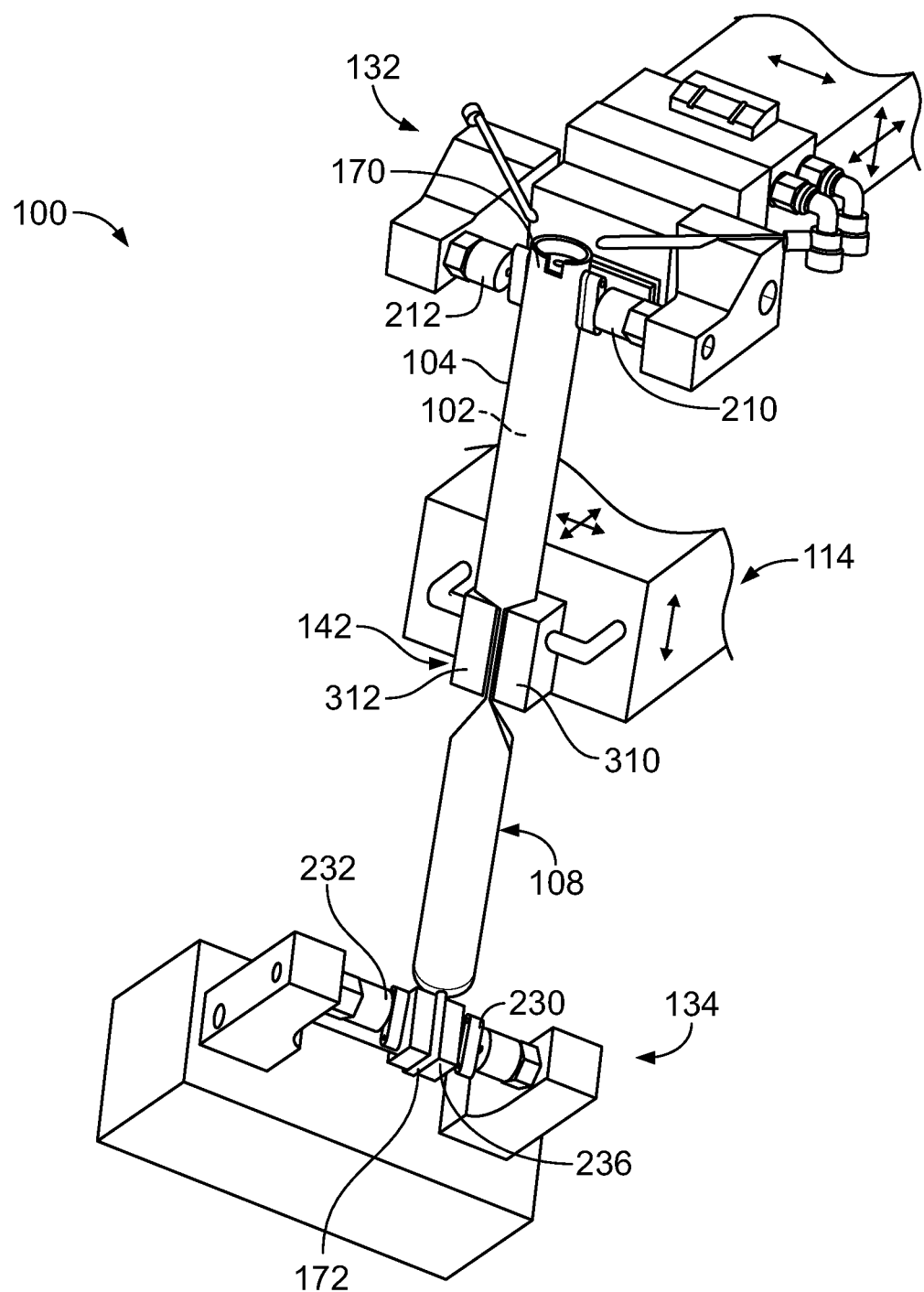
FIG. 4 is a perspective view of a portion of the part packing system in accordance with an exemplary embodiment.

FIG. 4 is a perspective view of a portion of the part packing system 100 in accordance with an exemplary embodiment. FIG. 4 illustrates the part loading machine 114 holding the product (for example, the part 102 within the elongated bag 104). The part 102 is shown fully loaded in the elongated bag 104 forming a product 108 that is ready to be moved to the product packing machine 116.

After the part gripper mechanism 142 releases the part 102 and the part 102 drops into the elongated bag 104, the part gripper mechanism 142 is free to move relative to the part 102 and the elongated bag 104. In an exemplary embodiment, the part gripper mechanism 142 is moved to grab the product 108 (elongated bag with the part therein) to then move the product 108 to the product packing machine 116. The part gripper mechanism 142 is moved to the middle of the product 108 and operated to grab the product 108. For example, the first and second end effectors 310, 312 are closed around the product 108 to securely hold the product 108. When the product is held by the part gripper mechanism 142, the first and second bag gripper mechanisms 132, 134 may be released from the elongated bag 104. For example, the end effectors 210, 212 may be opened to release the first end 170 and the end effectors 230, 232 may be opened to release the second end 172. The product may then be moved to the product packing machine 116.

Figure 5:
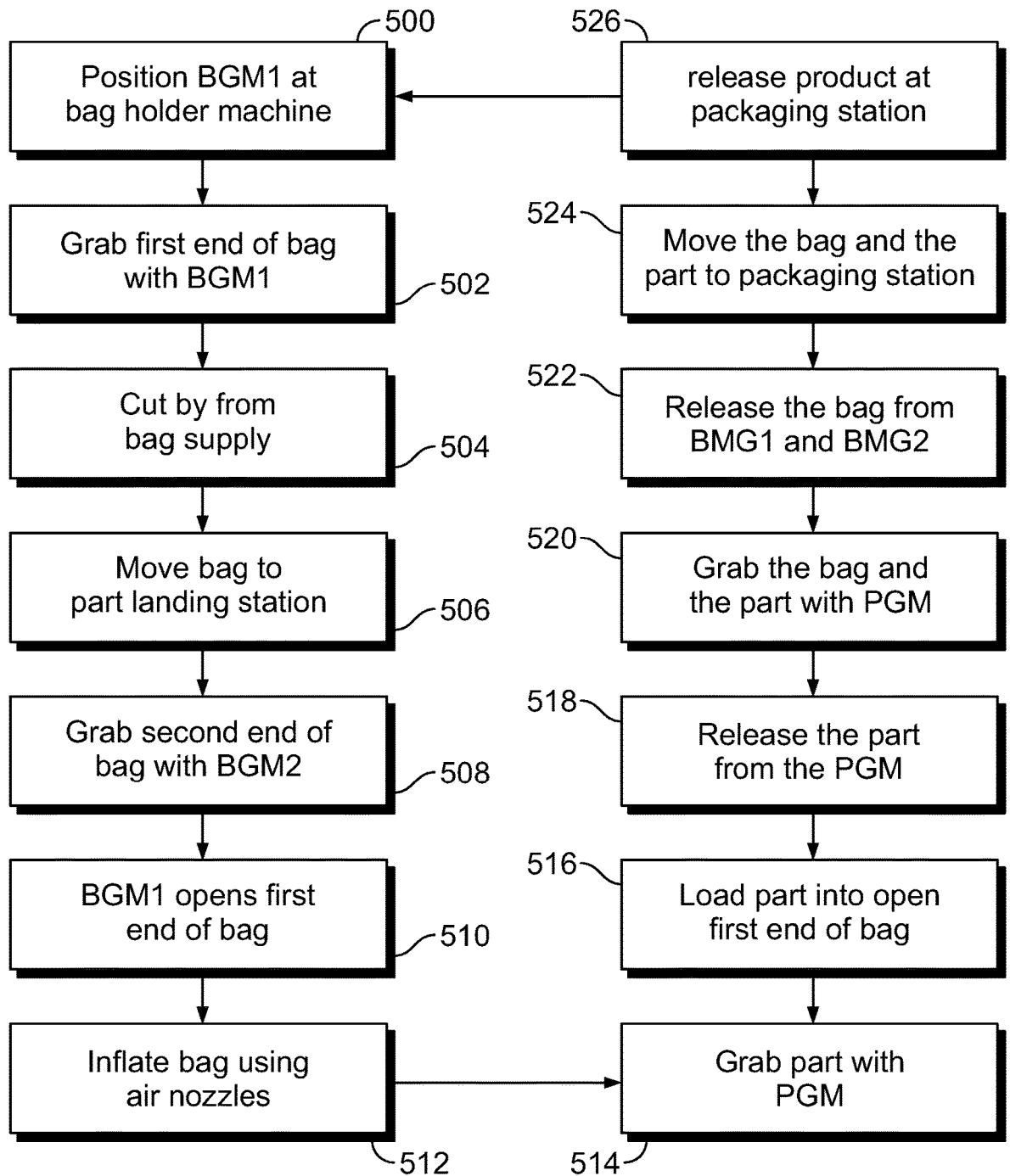
FIG. 5 is a flowchart showing a method of packing a part in an elongated bag in accordance with an exemplary embodiment.

FIG. 5 is a flowchart showing a method of packing a part in an elongated bag in accordance with an exemplary embodiment. Various steps may be omitted and the order of the steps may be altered in various alternative embodiments. The method may be used by a controller of a part packing system to control the various components, devices and machines of the part packing system to load an elongated part in an elongated bag. The method is provided to automate the part packing system to load the parts into the elongated bags without human intervention.

At 500, the method includes positioning a first bag gripper mechanism (BGM1) at a bag holder machine. BGM1 is movable in three-dimensional space. For example, BGM1 may be provided at an end of a manipulator or robot that is movable in three-dimensional space. At 502, the method includes grabbing a first end of the elongated bag with BGM1. BGM1 may include suction cups or gripping fingers used to grab the end of the elongated bag. At 504, the method includes cutting the elongated bag from a bag supply. For example, the bag holder machine may include a cutter used to cut a continuous supply of bags at predetermined lengths.

At 506, the method includes moving the elongated bag to a part loading station. The elongated bag is moved by BGM1. For example, the manipulator may move BGM1 from the bag holder machine to the part loading station. At 508, the method includes grabbing the second end of the elongated bag with a second bag gripper mechanism (BGM2). In an exemplary embodiment, BGM2 holds the elongated bag with the second end closed. For example, first and second end effectors of BGM2 may pinch the second end of the elongated bag to close the second end. In an exemplary embodiment, BGM1 move the elongated bag to align the second end of the bag with BGM2. In alternative embodiments, BGM2 may be movable in three-dimensional space to grab the second end of the elongated bag.

At 510, the method includes opening the first end of the bag using BGM1. For example, BGM1 may include first and second end effectors that hold first and second sides of the bag. The end effectors are movable relative to each other to open the first end of the bag. At 512, the method includes inflating the bag using air nozzles. The air nozzles may be coupled to BGM1 and positioned to direct the airflow into the first end of the elongated bag. The bag is inflated to receive the part. Having the second end closed, allows the bag to easily inflate.

At 514, the method includes grabbing the part with a part gripper mechanism (PGM). In an exemplary embodiment, PGM includes first and second end effectors configured to grab her pinch the part, such as near a middle of the part. PGM is movable in three-dimensional space to pick up the part and move the part relative to the elongated bag. For example, PGM may be provided at an end of a manipulator or robotic arm that is movable in three-dimensional space. At 516, the method includes loading the part into the open first end of the bag. For example, PGM may be moved toward BGM1 two load the part at least partially into the elongated bag. Having the elongated bag inflated allows the part to be easily loaded into the elongated bag and prevents damage to the elongated bag. At 518, the method includes releasing the part from PGM. For example, the first and second end effectors of PGM may be opened to release the part. When the part is released, the part is dropped into the elongated bag, such as to the closed second end of the elongated bag. After the part is released, PGM is freely movable relative to the part.

At 520, the method includes grabbing the elongated bag with the part therein using PGM. For example, PGM is moved from the first end of the elongated bag to the middle of the elongated bag. The first and second end effectors of PGM are closed around the bag and the part to grab the bag and the part together. At 522, the method includes releasing the first and second ends of the elongated bag from BGM1 and BGM2. For example, the end effectors of BGM1 and BGM2 may be opened to release the first and second ends of the elongated bag. At 524, the method includes moving the bag with the part therein to a packaging station. PGM is used to move the bag and the part together from the part loading station to the packaging station. At 526, the method includes releasing the product (for example, the elongated bag with the part therein) at the packaging station. The product is released by opening the first and second end effectors of the PGM. The product may be released into a bin or box for further processing or packaging. For example, the first and second ends of the elongated bag may be closed or sealed at the packaging station. The elongated bag or the box that receives the product may be labeled at the packaging station. Other processing steps may occur at the packaging station.

The method uses automated or computer controlled machines or devices to load the elongated part in the elongated bag. The method automates the part packing system to load the parts into the elongated bags without human intervention. The method allows loading and packaging the parts in the bags quickly, repeatedly and consistently. Various steps of the method may occur simultaneously to expedite the loading process.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A part packing system for packing a part elongated along a longitudinal axis in an elongated bag, the part packing system comprising:
   a bag holding machine including a first bag gripper mechanism, a second bag gripper mechanism, and an air nozzle;
   the first bag gripper mechanism configured to hold a first end of the elongated bag, the first bag gripper mechanism opening the first end of the elongated bag;
   the second bag gripper mechanism configured to hold a second end of the elongated bag, the second bag gripper mechanism closing the second end of the elongated bag; and
   the air nozzle located proximate to the first bag gripper mechanism, the air nozzle configured to inflate the elongated bag with an airflow directed into the first end of the elongated bag;
   wherein the first bag gripper mechanism holds the inflated elongated bag with the first end open to receive the part in the open first end while the air nozzle directs the airflow into the elongated bag.

2. The part packing system of claim 1, wherein the bag holding machine includes a bag manipulator, the first bag gripper mechanism mounted to the bag manipulator, the bag manipulator movable in three-dimensional space to move the first bag gripper mechanism relative to the second bag gripper mechanism.

3. The part packing system of claim 1, wherein the first bag gripper mechanism includes a first end effector and a second end effector opposing each other across a bag holding space, the first end effector and the second end effector holding opposite sides of the first end of the elongated bag in the bag holding space.

4. The part packing system of claim 3, wherein at least one of the first end effector and the second end effector being movable relative to the other of the first end effector and the second effector to open the first end of the elongated bag.

5. The part packing system of claim 3, wherein the first end effector includes a suction cup and the second end effector includes a suction cup to hold the elongated bag.

6. The part packing system of claim 3, wherein the first end effector holds the elongated bag using vacuum pressure and the second effector holds the elongated bag using vacuum pressure.

7. The part packing system of claim 1, wherein the bag holder machine includes a fixture holding the second bag gripper mechanism in a fixed position, the bag holding machine including a bag manipulator holding the first bag gripper mechanism, the bag manipulator being movable relative to the fixture to position the second end of the elongated bag at the second bag gripper mechanism.

8. The part packing system of claim 1, further comprising a part loading machine having a part gripper mechanism configured to hold the part and move the part into the inflated elongated bag through the open first end.

9. The part packing system of claim 8, wherein the part gripper mechanism is configured to release the part into the elongated bag, the part gripper mechanism being configured to grab the elongated bag with the part therein.

10. The part packing system of claim 8, wherein the part loading machine includes a part manipulator, the part gripper mechanism being mounted to the part manipulator, the part manipulator moving the part gripper mechanism to move the part relative to the elongated bag.

11. The part packing system of claim 8, wherein the part gripper mechanism includes a first jaw element and a second jaw element movable relative to each other to grip and release the part.

12. The part packing system of claim 1, further comprising a bag dispensing machine having a supply of elongated bags, the bag dispensing machine having a cutter configured to cut the elongated bag from the supply of elongated bags, the first bag gripper mechanism being configured to move the elongated bag cut from the supply of elongated bags away from the bag dispensing machine.

13. A part packing system for packing a part elongated along a longitudinal axis in an elongated bag, the part packing system comprising:
- a bag holding machine including a first bag gripper mechanism configured to hold a first end of the elongated bag, a second bag gripper mechanism configured to hold a second end of the elongated bag, and an air nozzle located proximate to the first bag gripper mechanism, the first bag gripper mechanism configured to open the first end of the elongated bag, the air nozzle configured to inflate the elongated bag with an airflow directed into the first end of the elongated bag when the first bag gripper mechanism opens the first end of the elongated bag; and
- a part loading machine having a part gripper mechanism configured to hold the part and move the part into the inflated elongated bag through the open first end.

14. The part packing system of claim 13, wherein the bag holding machine includes a bag manipulator, the first bag gripper mechanism mounted to the bag manipulator, the bag manipulator movable in three-dimensional space to move the first bag gripper mechanism relative to the second bag gripper mechanism.

15. The part packing system of claim 13, wherein the first bag gripper mechanism includes a first end effector and a second end effector opposing each other across a bag holding space, the first end effector and the second end effector holding opposite sides of the first end of the elongated bag in the bag holding space.

16. The part packing system of claim 13, wherein the part gripper mechanism is configured to release the part into the elongated bag, the part gripper mechanism being configured to grab the elongated bag with the part therein.

17. The part packing system of claim 13, wherein the part loading machine includes a part manipulator, the part gripper mechanism being mounted to the part manipulator, the part manipulator moving the part gripper mechanism to move the part relative to the elongated bag.

18. A method of packing a part in an elongated bag elongated along a longitudinal axis, the method comprising:
- grabbing a first end of the elongated bag using a first bag gripper mechanism;
- grabbing a second end of the elongated bag using a second bag gripper mechanism;
- opening the first end of the elongated bag;
- inflating the elongated bag by blowing air in the first end of the elongated bag using an air nozzle;
- grabbing the part using a part gripper mechanism;
- loading the part into the first end of the elongated bag;
- releasing the part from the part gripper mechanism to drop the part into the elongated bag; and
- grabbing the elongated bag with the part therein using the part gripper mechanism; and
- moving the elongated bag with the part therein to a packaging station using the part gripper mechanism.

19. The method of claim 18, further comprising releasing the first end of the elongated bag from the first bag gripper mechanism after grabbing the elongated bag with the part therein using the part gripper mechanism, said moving the elongated bag with the part therein includes moving the elongated bag with the part therein away from the first bag gripper mechanism.

20. The method of claim 18, wherein said grabbing the first end of the elongated bag using the first bag gripper mechanism includes grabbing the first end of the elongated bag between a first end effector and a second end effector, and wherein said opening the first end of the elongated bag includes moving the first end effector away from the second end effector to open the first end of the elongated bag.

\* \* \* \* \*